(12) United States Patent
Takemori et al.

(10) Patent No.: US 10,970,398 B2
(45) Date of Patent: Apr. 6, 2021

(54) DATA PROVISION SYSTEM, DATA SECURITY DEVICE, DATA PROVISION METHOD, AND COMPUTER PROGRAM

(71) Applicant: KDDI CORPORATION, Tokyo (JP)

(72) Inventors: Keisuke Takemori, Tokyo (JP); Seiichiro Mizoguchi, Tokyo (JP); Ayumu Kubota, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 179 days.

(21) Appl. No.: 16/307,414

(22) PCT Filed: Mar. 28, 2017

(86) PCT No.: PCT/JP2017/012720
§ 371 (c)(1),
(2) Date: Dec. 5, 2018

(87) PCT Pub. No.: WO2018/029893
PCT Pub. Date: Feb. 15, 2018

(65) Prior Publication Data
US 2019/0347421 A1 Nov. 14, 2019

(30) Foreign Application Priority Data

Aug. 10, 2016 (JP) .............................. JP2016-158121

(51) Int. Cl.
*G06F 21/57* (2013.01)
*G06F 21/44* (2013.01)
(Continued)

(52) U.S. Cl.
CPC ............ *G06F 21/57* (2013.01); *B60R 16/023* (2013.01); *G07C 5/008* (2013.01); *H04L 63/062* (2013.01)

(58) Field of Classification Search
None
See application file for complete search history.

(56) References Cited

U.S. PATENT DOCUMENTS

2001/0002814 A1   6/2001  Suganuma et al.
2008/0208365 A1*  8/2008  Grgic ................. G05B 19/042
                                                   700/2
(Continued)

FOREIGN PATENT DOCUMENTS

CN         102495601 A      6/2012
CN         103338985 A     10/2013
(Continued)

OTHER PUBLICATIONS

A Secure Automotive On-Board Protocols: A Case of Over-the-Air Firmware Updates. Idrees et al. LNCS. (Year: 2011).*

(Continued)

*Primary Examiner* — Venkat Perungavoor
(74) *Attorney, Agent, or Firm* — Greenblum & Bernstein, P.L.C.

(57) ABSTRACT

A data provision system includes a data provision device and a data security device installed in a vehicle. The data provision device includes a vehicle interface configured to transmit data to and receive data from the vehicle and an expected value calculation unit configured to calculate an expected value of application data to be applied to an in-vehicle computer installed in the vehicle. The application data and the expected value are transmitted to the vehicle through the vehicle interface. The data security device includes an interface unit configured to transmit data to and receive data from a device outside the data security device and a measurement unit configured to calculate a measurement value of the application data received from the data provision device through the interface unit and verify the measurement value on the basis of the expected value received from the data provision device through the interface unit.

4 Claims, 7 Drawing Sheets

(51) Int. Cl.
  *B60R 16/023* (2006.01)
  *G07C 5/00* (2006.01)
  *H04L 29/06* (2006.01)
  *G06F 11/36* (2006.01)

(56) References Cited

U.S. PATENT DOCUMENTS

| | | |
|---|---|---|
| 2011/0320089 A1 | 12/2011 | Lewis |
| 2012/0093312 A1 | 4/2012 | Gammel et al. |
| 2013/0219170 A1 | 8/2013 | Naitou et al. |
| 2014/0181526 A1 | 6/2014 | Alrabady et al. |
| 2015/0113521 A1 | 4/2015 | Suzuki et al. |
| 2016/0378457 A1 | 12/2016 | Adachi et al. |

FOREIGN PATENT DOCUMENTS

| | | |
|---|---|---|
| CN | 104579664 A | 4/2015 |
| CN | 104601329 A | 5/2015 |
| JP | 11-205308 A | 7/1999 |
| JP | 2008-239021 A | 10/2008 |
| JP | 2012-184604 A | 9/2012 |
| JP | 2013-192091 A | 9/2013 |
| JP | 2014-514203 A | 6/2014 |
| JP | 2014-182571 A | 9/2014 |
| JP | 2015-103163 A | 6/2015 |
| JP | 2016-072675 A | 5/2016 |
| JP | 2016-092811 A | 5/2016 |
| WO | 2012/130257 A1 | 10/2012 |

OTHER PUBLICATIONS

A Framework for Self-Verification of Firmware Updates over the Air in Vehicle ECUs. Nilsson. IEEE. (Year: 2008).*
AutoPlug: An Automotive Test-bed for Electronic Controller Unit Testing and Verification. Drolia. IEEE. (Year: 2011).*
Design and Implementation of Bootloader for Vehicle Control Unit Based on Can Bus. Tan et al. SAE—China. (Year: 2012).*
Automotive Ethernet in On-Board Diagnosis(Over IP) & In-Vehicle Networking. Varun. ICES. (Year: 2014).*
Sheldon et al., "Encyclopedia of Networking, Japan", Softbank Corporation, First Edition, May 31, 1996, pp. 691-692, together with a partial English translation.
Takemori, "In-vehicle Network Security Using Secure Elements-Discussion of Security Technologies—", IEICE Technical Report, vol. 114, No. 508, Mar. 2015, pp. 73-78.
Takemori et al., "Key Managements for ECU and Code Authentications Using Tamper-resistant Secure Element", IEICE Technical Report, vol. 115,No. 366, Dec. 10, 2015, pp. 227-232.
Takemori et al., "Protection for Automotive Control System Using Secure Boot and Authentication", IEICE Technical Report, vol. 114, No. 225, Sep. 12, 2014, pp. 47-54.
Tsuji, "Relationship between Information Processing Technology and Society in", Information Processing, Information Processing Society of Japan,vol. 42, No. 3, Mar. 15, 2001, pp. 316-321, together with a partial English translation.
"AN4240 Application note", STMicroelectronics, http://www.st.com/web/en/resource/technical/document/application_note/DM00075575.pdf Aug. 3, 2016. pp. 1-30.
"Road vehicles—Unified diagnostic services (UDS)—Part 1: Specification and requirements", International Standard, ISO14229-1, Second edition, Mar. 15, 2013.
Asano, "Increased Necessity of Internet Authetication by Establishment of Electronic Signature Law Practical Guidebook for Introduction of "PKI", N+1 Magazine Network Guide, Japan", Softbank Publishing Corp., vol. 1, No. 6, Sep. 1, 2001, pp. 94-95, together with a partial English translation.
U.S. Appl. No. 16/307,394 to Keisuke Takemori et al., which was filed on Dec. 5, 2018.
U.S. Appl. No. 16/307,681 to Keisuke Takemori et al., which was filed on Dec. 6, 2018.
Keisuke Takemori, In-vehicle Network Security Using Secure Elements—Discussion of Security Technologies—, Summer Workshop on Embedded System Technology (SWEST17), [Online], https://swest.toppers.jp/SWEST17/data/s3a_proceeding.pdf Aug. 28, 2015, Retrieval Date Mar. 15, 2010.
Office Action issued in Japanese family member Appl. No. 2016-158121, dated Apr. 4, 2017, along with an English translation thereof.
Decision of Rejection issued in Japanese family member Patent Appl. No. 2016-158121, dated Jul. 18, 2017, along with an English translation thereof.
International Search Report issued in International Patent Application No. PCT/JP2017/012720, dated Jun. 13, 2017, along with an English translation thereof.
Office Action issued in Japanese family member Patent Appl. No. 2017-201990, dated Nov. 27, 2018, along with an English translation thereof.
"Secure software update capability for ITS communications devices", International Telecommunication Union; ITU-T Draft, Jul. 30, 2015, XP044149999.
Official Communication issued in European Patent Office (EPO) Patent Application No. 17838969.8, dated Dec. 3, 2019.
CN Office Action, with Partial English Translation (Search Report), dated Jan. 12, 2021, in CN Application No. 201780035235.6.

\* cited by examiner

DATA PROVISION SYSTEM, DATA SECURITY DEVICE, DATA PROVISION METHOD, AND COMPUTER PROGRAM

TECHNICAL FIELD

The present invention relates to a data provision system, a data security device, a data provision method, and a computer program.

Priority is claimed on Japanese Patent Application No. 2016-158121, filed Aug. 10, 2016, the content of which is incorporated herein by reference.

BACKGROUND ART

Conventionally, a car has an electronic control unit (ECU), and implements a function such as engine control through the ECU. The ECU is a type of computer and implements a desired function through a computer program. For example, security technology for an in-vehicle control system configured by connecting a plurality of ECUs to a controller area network (CAN) is described in Non-Patent Document 1.

CITATION LIST

Non-Patent Literature

[Non-Patent Document 1]
Keisuke TAKEMORI, ""In-vehicle Network Security Using Secure Elements: Discussion of Security Technologies", Institute of Electronics, Information and Communication Engineers, Technical Report, vol. 114, no. 508, pp. 73-78, March 2015

[Non-Patent Document 2]
STMicroelectronics, "AN4240 Application note", retrieved on Aug. 3, 2016, Internet <URL: http://www.st.com/web/en/resource/technical/document/application_note/DM00075575.p df>.

[Non-Patent Document 3]
INTERNATIONAL STANDARD, ISO 14229-1, "Road vehicles Unified diagnostic services (UDS) Part 1: Specification and requirements", Second edition, 2013-03-15

SUMMARY OF INVENTION

Problem to be Solved by the Invention

An objective is to improve the reliability of data such as an update program to be applied to an ECU of an in-vehicle control system of a car.

The present invention has been made in consideration of such circumstances and an objective of the present invention is to provide a data provision system, a data security device, a data provision method, and a computer program capable of improving the reliability of data to be applied to an in-vehicle computer such as an ECU.

Means for Solving the Problem (1) An aspect of the present invention is a data provision system, including: a data provision device; and a data security device installed in a vehicle, wherein the data provision device includes a vehicle interface configured to transmit data to and receive data from the vehicle; and an expected value calculation unit configured to calculate an expected value of application data to be applied to an in-vehicle computer installed in the vehicle, wherein the application data and the expected value are transmitted to the vehicle through the vehicle interface, and wherein the data security device includes an interface unit configured to transmit data to and receive data from a device outside the data security device; and a measurement unit configured to calculate a measurement value of the application data received from the data provision device through the interface unit and verify the measurement value on the basis of the expected value received from the data provision device through the interface unit, wherein the application data for which the verification of the measurement value has succeeded is transmitted to the in-vehicle computer through the interface unit.

(2) An aspect of the present invention is the data provision system according to (1), wherein the data security device is configured to receive, from the in-vehicle computer through the interface unit, a data application result indicating success or failure of application of the application data, which is transmitted to the in-vehicle computer, to the in-vehicle computer and is configured to transmit the received data application result to the data provision device through the interface unit.

In an aspect of the present invention, the data security device may be configured to transmit the application data for which the verification of the measurement value has succeeded and a message authentication code for the application data to the in-vehicle computer through the interface unit.

In an aspect of the present invention, the message authentication code may be a message authentication code related to a packet that is configured to store the application data for which the verification of the measurement value has succeeded, and to be transmitted to the in-vehicle computer.

In an aspect of the present invention, the data security device may be configured to divide the application data for which the verification of the measurement value has succeeded into a plurality of blocks, calculate the message authentication code for each block, and transmit the block and the message authentication code to the in-vehicle computer through the interface unit.

(3) An aspect of the present invention is a data security device installed in a vehicle, including: an interface unit configured to transmit data to and receive data from a device outside the data security device; and a measurement unit configured to calculate a measurement value of application data received from a data provision device through the interface unit and verify the measurement value on the basis of an expected value received from the data provision device through the interface unit, wherein the application data for which the verification of the measurement value has succeeded is transmitted to an in-vehicle computer installed in the vehicle through the interface unit.

(4) An aspect of the present invention is a data provision method for use in a data provision system including a data provision device and a data security device installed in a vehicle, the data provision method including: calculating, by the data provision device, an expected value of application data to be applied to an in-vehicle computer installed in the vehicle; transmitting, by the data provision device, the application data and the expected value to the vehicle through a vehicle interface configured to transmit data to and receive data from the vehicle; calculating, by the data security device, a measurement value of the application data received from the data provision device through an interface unit configured to transmit data to and receive data from a device outside the data security device and verifying the measurement value on the basis of the expected value received from the data provision device through the interface unit; and transmitting, by the data security device, the application data for which the verification of the measurement value has succeeded to the in-vehicle computer through the interface unit.

(5) An aspect of the present invention is a computer program for causing a computer of a data security device installed in a vehicle to execute a process of: calculating a measurement value of application data received from a data provision device through an interface unit configured to transmit data to and receive data from a device outside the data security device and verifying the measurement value on the basis of the expected value received from the data provision device through the interface unit; and transmitting the application data for which the verification of the measurement value has succeeded to an in-vehicle computer installed in the vehicle through the interface unit.

Advantageous Effects of Invention

According to the present invention, it is possible to improve reliability of data to be applied to an in-vehicle computer such as an ECU.

DESCRIPTION OF EMBODIMENTS

Hereinafter, embodiments of the present invention will be described with reference to the drawings. Also, in the following embodiments, an example in which a car is used as a vehicle will be described.

Figure 1:
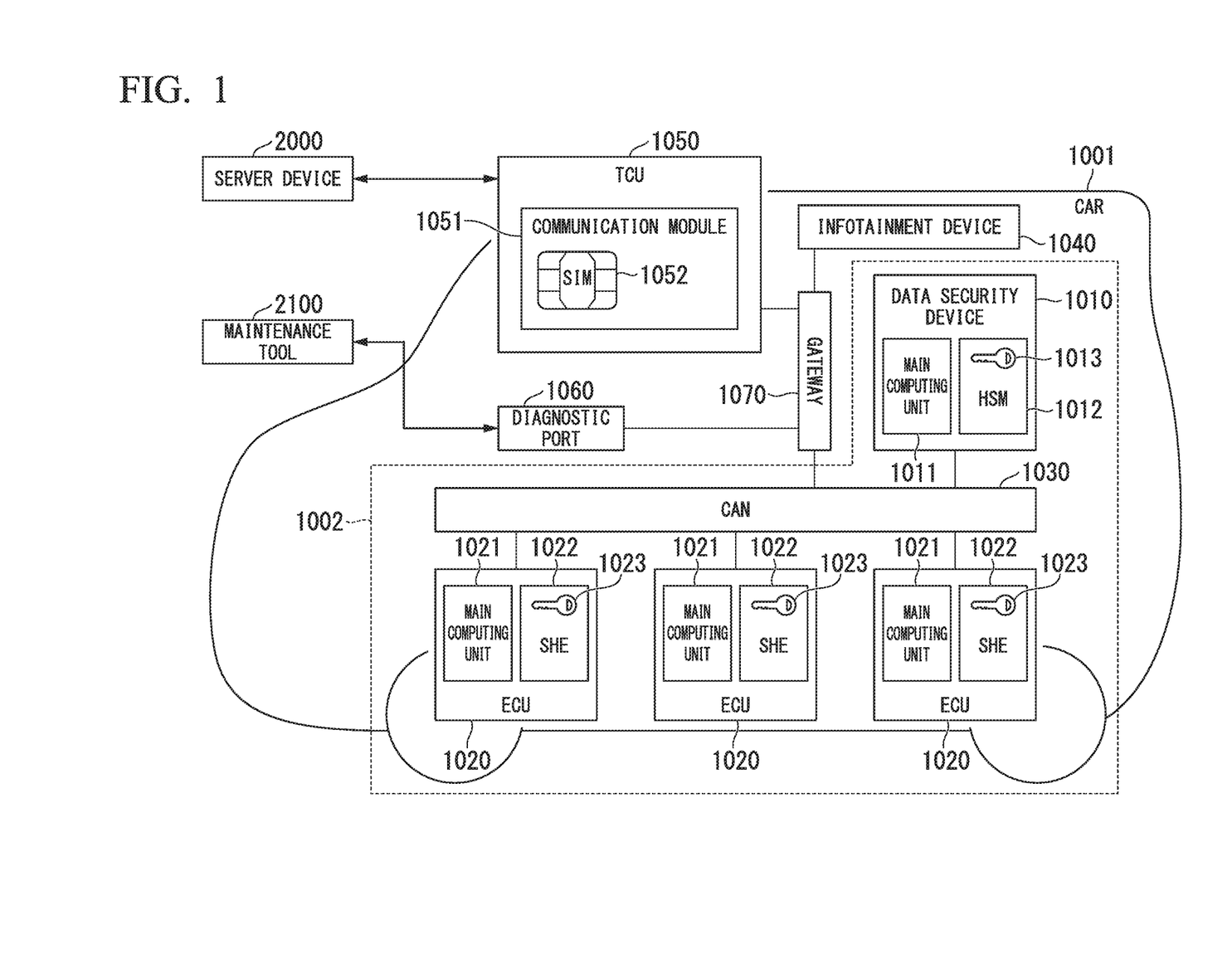
FIG. 1 is a diagram showing an example of a configuration of a data provision system and a car 1001 according to an embodiment.

FIG. 1 is a diagram showing an example of a configuration of a data provision system and a car 1001 according to an embodiment. In the present embodiment, an electronic control unit (ECU) installed in the car 1001 will be described as an example of an in-vehicle computer.

In FIG. 1, the car 1001 includes a data security device 1010 and a plurality of ECUs 1020. The ECU 1020 is an in-vehicle computer provided in the car 1001. The ECU 1020 has a control function such as engine control of the car 1001. Examples of the ECU 1020 include an ECU having an engine control function, an ECU having a steering-wheel control function, an ECU having a brake control function, and the like. The data security device 1010 has a function of data security (security) applied to the ECU 1020 installed in the car 1001.

Also, any ECU installed in the car 1001 may function as the data security device 1010.

The data security device 1010 and the plurality of ECUs 1020 are connected to a controller area network (CAN) 1030 provided in the car 1001. The CAN 1030 is a communication network. The CAN is known as one of communication networks installed in vehicles. The data security device 1010 exchanges data with each ECU 1020 via the CAN 1030. The ECU 1020 exchanges data with other ECUs 1020 via the CAN 1030.

Also, as a communication network installed in the vehicle, a communication network other than a CAN may be provided in the car 1001, and the exchange of data between the data security device 1010 and the ECU 1020 and the exchange of data between the ECUs 1020 may be performed via a communication network other than a CAN. For example, the car 1001 may include a local interconnect network (LIN). Also, the CAN and the LIN may be provided in the car 1001. Also, the ECU 1020 connected to the LIN may be provided in the car 1001. Also, the data security device 1010 may be connected to the CAN and the LIN. Also, the data security device 1010 may exchange data with the ECU 1020 connected to the CAN via the CAN, and exchange data with the ECU 1020 connected to the LIN via the LIN. Also, the ECUs 1020 may exchange data with each other via the LIN.

An in-vehicle computer system 1002 provided in the car 1001 is configured by connecting the data security device 1010 and the plurality of ECUs 1020 to the CAN 1030. In the present embodiment, the in-vehicle computer system 1002 functions as an in-vehicle control system of the car 1001.

A gateway 1070 monitors communication between the inside and the outside of the in-vehicle computer system 1002. The gateway 1070 is connected to the CAN 1030. As examples of a device outside the in-vehicle computer system 1002, the gateway 1070 may be connected to an infotainment device 1040, a telecommunication unit (TCU) 1050, and a diagnostic port 1060. The data security device 1010 and the ECU 1020 communicate with devices outside the in-vehicle computer system 1002 via the gateway 1070.

Also, in the configuration of the CAN 1030, the CAN 1030 may include a plurality of buses (communication lines) and the plurality of buses may be connected to the gateway 1070. In this case, one or more ECUs 1020 are connected to one bus. Also, the data security device 1010 and the ECU 1020 may be connected to the same bus or a bus to which the data security device 1010 is connected and a bus to which the ECU 1020 is connected may be separately provided.

The car 1001 includes the diagnostic port 1060. For example, an on-board diagnostics (OBD) port may be used as the diagnostic port 1060. A device outside the car 1001 can be connected to the diagnostic port 1060. A device outside the car 1001 connectable to the diagnostic port 1060 is, for example, a maintenance tool 2100 shown in FIG. 1 or the like. Data is exchanged between the data security device 1010 and a device connected to the diagnostic port 1060, for example, the maintenance tool 2100, via the diagnostic port 1060 and the gateway 1070. The maintenance tool 2100 may have a function of a conventional diagnostic terminal connected to the OBD port.

The car 1001 includes the infotainment device 1040. Examples of the infotainment device 1040 include those having a navigation function, a position information service function, a multimedia playback function for music, movies, and the like, a speech communication function, a data communication function, an Internet connection function, and the like.

The car 1001 includes the TCU 1050. The TCU 1050 is a communication device. The TCU 1050 includes a communication module 1051. The communication module 1051 performs wireless communication using a wireless communication network. The communication module 1051 includes a subscriber identity module (SIM) 1052. The SIM 1052 is an SIM in which information for using the wireless communication network is written. By using the SIM 1052, the communication module 1051 can be connected to the wireless communication network to perform wireless communication. Also, an embedded subscriber identity module (eSIM) may be used as the SIM 1052.

The data security device 1010 exchanges data with the TCU 1050 via the gateway 1070. Also, the TCU 1050 and the data security device 1010 may be directly connected via a communication cable and the TCU 1050 and the data security device 1010 may exchange data via the communication cable. For example, the TCU 1050 and the data security device 1010 may be directly connected through a universal serial bus (USB) cable and the TCU 1050 and the data security device 1010 may exchange data via the USB cable. Also, if the TCU 1050 and the data security device 1010 are directly connected via a communication cable such as a USB cable and exchange of data between the TCU 1050 and the data security device 1010 via the communication cable is performed, a transmission-side device of the TCU 1050 and the data security device 1010 may include a buffer configured to temporarily store data to be transmitted to a reception side device.

Also, as another connection form of the TCU 1050, for example, the TCU 1050 may be connected to the infotainment device 1040 and the data security device 1010 may exchange data with the TCU 1050 via the gateway 1070 and the infotainment device 1040. Alternatively, the TCU 1050 may be connected to the diagnostic port 1060 and the data security device 1010 may exchange data with the TCU 1050 connected to the diagnostic port 1060 via the gateway 1070 and the diagnostic port 1060. Alternatively, the data security device 1010 may include a communication module 1051 including the SIM 1052. When the data security device 1010 includes the communication module 1051 including the SIM 1052, the car 1001 may not include the TCU 1050.

The data security device 1010 includes a main computing unit 1011 and a hardware security module (HSM) 1012. The main computing unit 1011 executes a computer program for implementing a function of the data security device 1010. The HSM 1012 has a cryptographic processing function and the like. The HSM 1012 is tamper resistant. The HSM 1012 is an example of a secure element (SE). The HSM 1012 includes a storage unit 1013 configured to store data. The main computing unit 1011 uses the HSM 1012.

The ECU 1020 includes a main computing unit 1021 and a secure hardware extension (SHE) 1022. The main computing unit 1021 executes a computer program configured to implement the function of the ECU 1020. The SHE 1022 has a cryptographic processing function and the like. The SHE 1022 is tamper resistant. The SHE 1022 is an example of a secure element. The SHE 1022 includes a storage unit 1023 configured to store data. The main computing unit 1021 uses the SHE 1022.

The server device 2000 transmits data to and receives data from the communication module 1051 of the TCU 1050 of the car 1001 via a communication circuit. The server device 2000 transmits data to and receives data from the communication module 1051 via a wireless communication network used by the communication module 1051 of the TCU 1050 of the car 1001. Alternatively, the server device 2000 may transmit and receive data to and from the communication module 1051 via a communication network such as the Internet and a wireless communication network. Also, for example, the server device 2000 and the communication module 1051 may be connected via a dedicated circuit such as a virtual private network (VPN) circuit and data may be transmitted and received through the dedicated circuit. For example, the dedicated circuit such as the VPN circuit may be provided by a wireless communication network corresponding to the SIM 1052. Also, the server device 2000 and the car 1001 may be connected through a communication cable. For example, the server device 2000 and the gateway 1070 of the car 1001 may be connected together through a communication cable.

The server device 2000 provides an ECU code to be applied to the ECU 1020 to the car 1001. The ECU code is an example of data to be applied to the ECU 1020. The ECU code may be a computer program such as an update program installed in the ECU 1020 or setting data such as a parameter setting value set in the ECU 1020.

Figure 2:
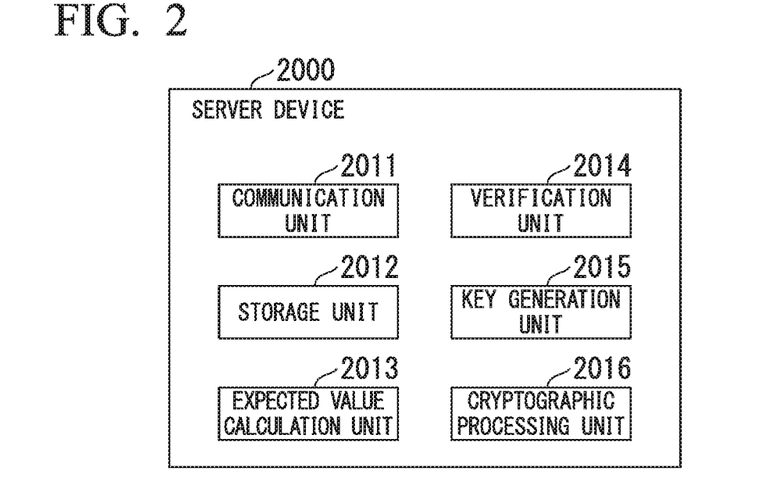
FIG. 2 is a diagram showing an example of a configuration of a server device 2000 according to an embodiment.

FIG. 2 is a diagram showing an example of a configuration of the server device 2000. In FIG. 2, the server device 2000 includes a communication unit 2011, a storage unit 2012, an expected value calculation unit 2013, a verification unit 2014, a key generation unit 2015, and a cryptographic processing unit 2016. The communication unit 2011 communicates with other devices via a communication circuit. The communication unit 2011 corresponds to a vehicle interface. The storage unit 2012 stores data. The expected value calculation unit 2013 calculates an expected value for the ECU code. The verification unit 2014 performs a process related to the verification of a measurement value of the ECU 1020. The key generation unit 2015 generates a key. The cryptographic processing unit 2016 encrypts data and decrypts encrypted data.

Functions of the server device 2000 are implemented by a central processing unit (CPU) included in the server device 2000 executing a computer program. Also, the server device 2000 may be configured using a general-purpose computer device or may be configured as a dedicated hardware device.

Figure 3:
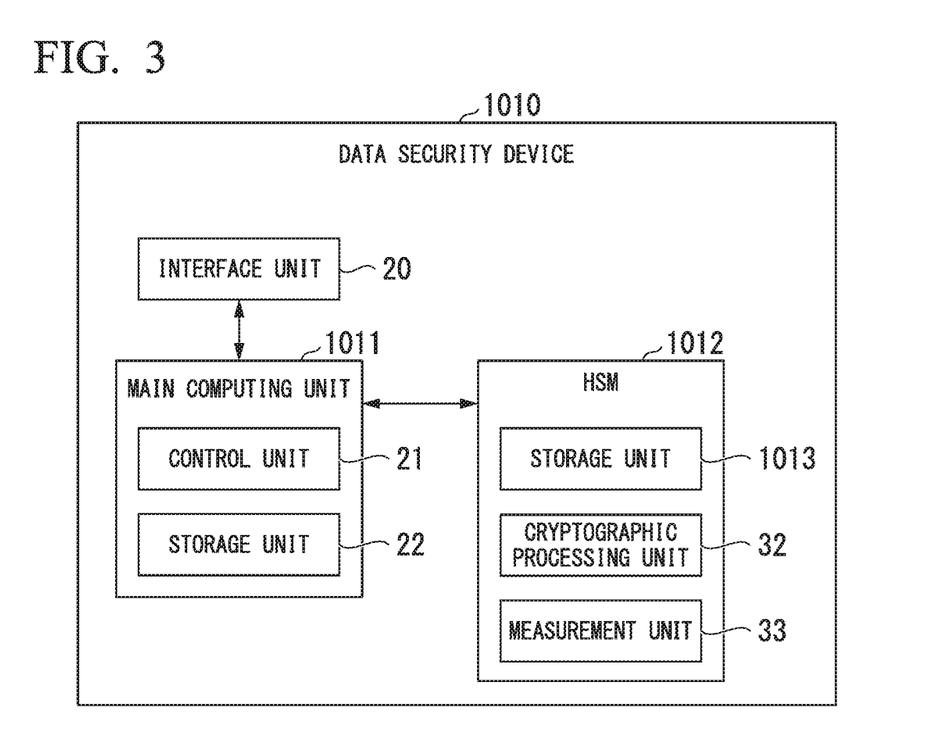
FIG. 3 is a diagram showing an example of a configuration of a data security device 1010 according to an embodiment.

FIG. 3 is a diagram showing an example of a configuration of the data security device 1010. In FIG. 3, the data security device 1010 includes a main computing unit 1011, an HSM 1012, and an interface unit 20. The main computing unit 1011 includes a control unit 21 and a storage unit 22. The HSM 1012 includes a storage unit 1013, a cryptographic processing unit 32, and a measurement unit 33.

The interface unit 20 transmits data to and receives data from a device outside its own data security device 1010. The interface unit 20 includes an interface configured to transmit and receive data via the CAN 1030. The main computing unit 1011 transmits data to and receives data from a device other than the data security device 1010 via the interface unit 20.

The control unit 21 controls the data security device 1010. The storage unit 22 stores data. The storage unit 1013 stores data. The cryptographic processing unit 32 encrypts data and decrypts encrypted data. The measurement unit 33 calculates a measurement value of data such as an ECU code and verifies the measurement value on the basis of an expected value.

Figure 4:
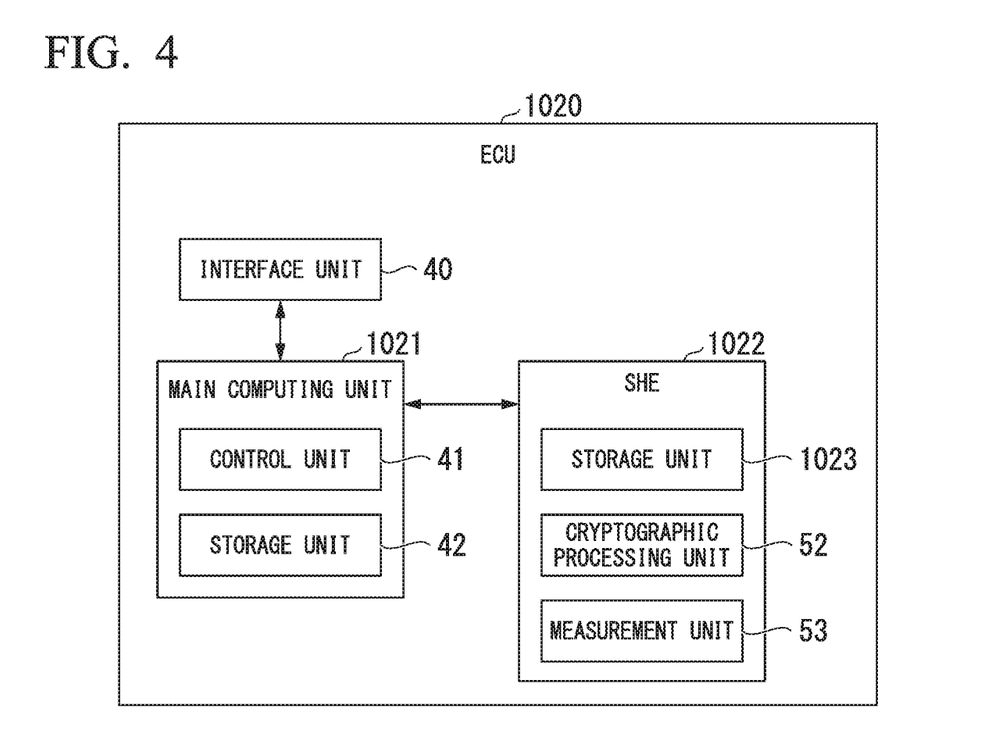
FIG. 4 is a diagram showing an example of a configuration of an ECU 1020 according to an embodiment.

FIG. 4 is a diagram showing an example of a configuration of the ECU 1020. In FIG. 4, the ECU 1020 includes a main computing unit 1021, an SHE 1022, and an interface unit 40. The main computing unit 1021 includes a control unit 41 and a storage unit 42. The SHE 1022 includes a storage unit 1023, a cryptographic processing unit 52, and a measurement unit 53.

The interface unit 40 transmits data to and receives data from a device outside its own ECU 1020. The interface unit 40 has an interface configured to transmit and receive data via the CAN 1030. The main computing unit 1021 transmits data to and receives data from a device other than its own ECU 1020 via the interface unit 40.

The control unit 41 controls the ECU 1020. The storage unit 42 stores data. The storage unit 1023 stores data. The cryptographic processing unit 52 encrypts data and decrypts encrypted data. The measurement unit 53 calculates a measurement value of data such as an ECU code and verifies the measurement value on the basis of the expected value.

Also, in the present embodiment, an HSM is used in the data security device 1010, but the data security device 1010 may use an SHE instead of the HSM. The SHE is described in, for example, Non-Patent Document 2.

Figure 5:
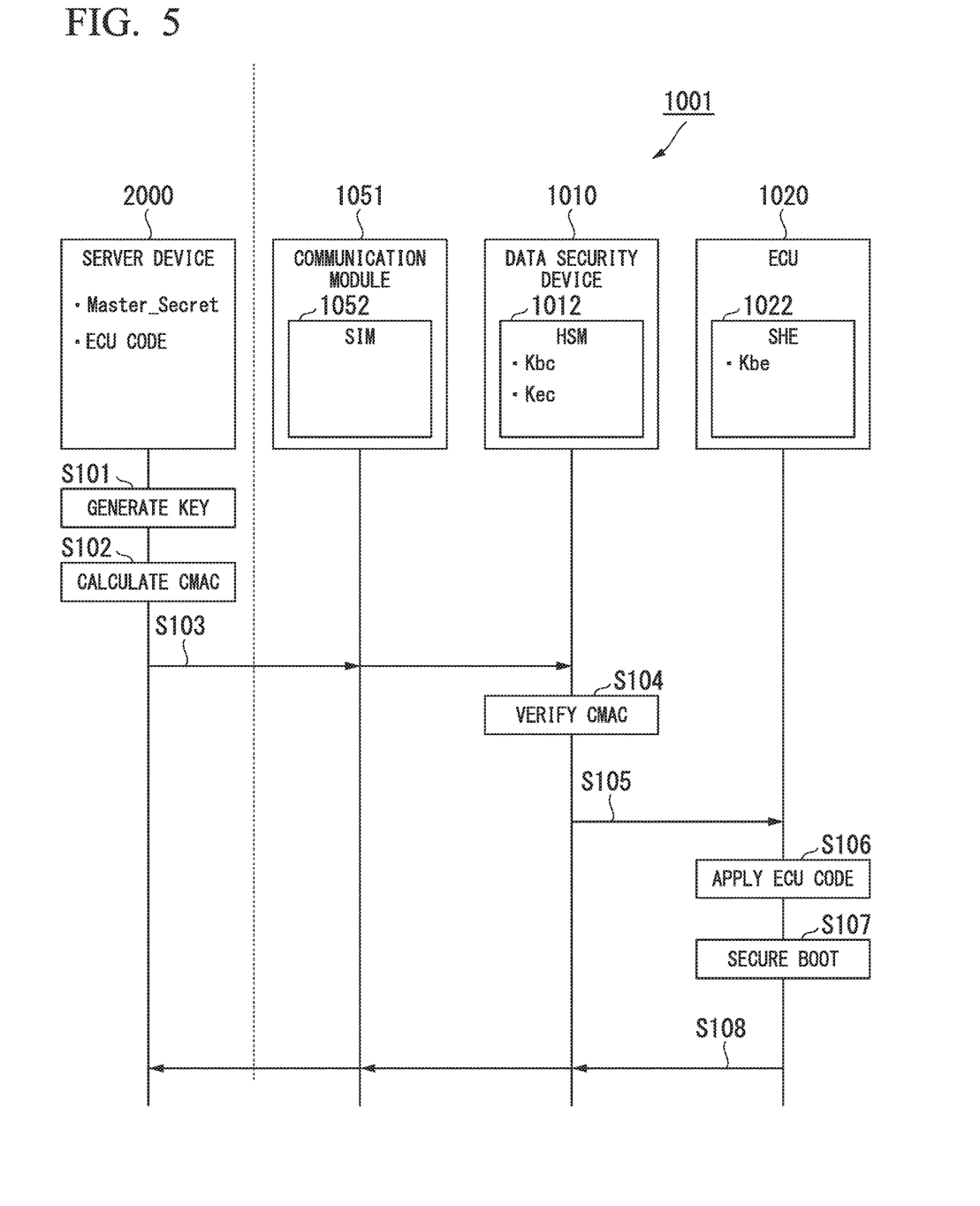
FIG. 5 is a sequence chart showing an example of a data provision method according to an embodiment.

Next, an example of a data provision method according to the present embodiment will be described with reference to FIG. 5. FIG. 5 is a sequence chart showing the example of the data provision method according to the present embodiment.

The server device 2000 pre-stores a master key Master_Secret and an ECU code of the ECU 1020 in the storage unit 2012. The ECU code of the ECU 1020 includes an ECU code to be applied to the ECU 1020. The data security device 1010 pre-stores a signature key Kbc and an encryption key Kec in the storage unit 1013 of the HSM 1012. The ECU 1020 pre-stores a signature key Kbe in the storage unit 1023 of the SHE 1022.

Hereinafter, the server device 2000 communicates with the TCU 1050 of the car 1001 through the communication unit 2011 and transmits data to and receives data from the data security device 1010 connected to the CAN 1030 of the car 1001 via the TCU 1050 and the gateway 1070. An encryption communication path may be used as a communication path between the server device 2000 and the data security device 1010. For example, the server device 2000 and the data security device 1010 may perform hypertext transfer protocol secure (https) communication as an example of the encryption communication path.

(Step S101) The key generation unit 2015 of the server device 2000 generates the signature key Kbc and the encryption key Kec of the data security device 1010 installed in the car 1001 and the signature key Kbe of the ECU 1020.

An example of a key generation method of the key generation unit 2015 will be described. The key generation unit 2015 generates a key (a common key) according to the following equation by using the master key Master_Secret stored in the storage unit 2012, an identifier UNIT_ID of a key generation target device, and a variable Nk.

Common key=Digest (Master_Secret, UNIT_ID, Nk)

However, if the key generation target device is the data security device 1010, UNIT_ID is an identifier SecU_ID of the data security device 1010. If the key generation target device is the ECU 1020, UNIT_ID is an identifier ECU_ID of the ECU 1020. Digest (Master_Secret, UNIT_ID, Nk) is a digest value generated from the master key Master_Secret, the identifier UNIT_ID, and the variable Nk. An example of the digest value includes a value calculated according to a hash function, a value calculated according to an exclusive OR operation, or a cipher-based message authentication code (CMAC). For example, the common key is a hash function value calculated using the master key Master_Secret, the identifier UNIT_ID, and the variable Nk as input values.

When a value of the variable Nk is different, a digest value is different. By changing the value of the variable Nk, it is possible to generate a different common keys from the same master key Master_Secret and the identifier UNIT_ID. For example, the value of the variable Nk for the signature key is denoted by Nk_a and the value of the variable Nk for the encryption key is denoted by Nk_b. The key generation unit 2015 uses the master key Master_Secret, the identifier SecU_ID of the data security device 1010, and the variables Nk_a and Nk_b to generate the signature key Kbc and the encryption key Kec of the data security device 1010 as different keys from:

Signature key Kbc=Digest (Master_Secret, SecU_ID, Nk_a), and

Encryption key Kec=Digest (Master_Secret, SecU_ID, Nk_b).

Also, the key generation unit 2015 uses the master key Master_Secret, the identifier ECU_ID of the ECU 1020, and the variable Nk_a to generate the signature key Kbe of the ECU 1020 from:

Signature key Kbe=Digest (Master_Secret, ECU_ID, Nk_a).

The storage unit 2012 stores the signature key Kbc and the encryption key Kec of the data security device 1010 and the signature key Kbe of the ECU 1020. The storage unit 1013 of the HSM 1012 of the data security device 1010 pre-stores the signature key Kbc and the encryption key Kec generated in the same key generation method as that of the server device 2000. The storage unit 1023 of the SHE 1022 of the ECU 1020 pre-stores the signature key Kbe generated in the same key generation method as that of the server device 2000.

Also, as another example of the key (common key) generation method according to the present embodiment, the signature key may be a value calculated according to a hash function and the encryption key may be a value calculated according to an exclusive OR operation. Alternatively, vice versa, i.e., the signature key may be a value calculated according to an exclusive OR operation and the encryption key may be a value calculated according to a hash function.

(Step S102) The expected value calculation unit 2013 of the server device 2000 calculates a CMAC of a scheduled ECU code to be applied to the ECU 1020 installed in the car 1001 by using the signature key Kbc of the data security device 1010. The CMAC of a result of such calculation is an expected value for the ECU code. Also, in the present embodiment, the CMAC is used as an example of the measurement value of the ECU code. The expected value (CMAC) of the ECU code calculated by the expected value calculation unit 2013 is used for verifying the measurement value (CMAC) of the ECU code. The storage unit 2012 stores the expected value (CMAC) of the ECU code.

(Step S103) The server device 2000 transmits the ECU code applied to the ECU 1020 and the expected value (CMAC) calculated by the expected value calculation unit 2013 to the data security device 1010 through the communication unit 2011. The data security device 1010 receives the ECU code and the expected value (CMAC) transmitted from the server device 2000.

(Step S104) The control unit 21 of the data security device 1010 transfers the CMAC of the expected value received from the server device 2000 to the HSM 1012 and sets the CMAC, as the expected value of the measurement value in the HSM 1012. The control unit 21 transfers the ECU code received from the server device 2000 to the HSM 1012 and causes the HSM 1012 to execute the measurement of the ECU code. The measurement unit 33 of the HSM 1012 calculates a measurement value of the ECU code by using the signature key Kbc stored in the storage unit 1013. In the present embodiment, the CMAC is used as an example of the measurement value.

Consequently, the measurement unit 33 calculates the CMAC of the ECU code by using the signature key Kbc stored in the storage unit 1013.

The measurement unit 33 compares the CMAC of the expected value with the CMAC of the calculated measurement value. The verification of the measurement value (CMAC) succeeds if a result of such a comparison indicates that the two match and the verification of the measurement value (CMAC) fails if a result of this comparison indicates that the two do not match. The HSM 1012 transfers the measurement value verification result "success or failure" to the control unit 21. When the result of verification of the measurement value of the ECU code is success, the control unit 21 moves the process to step S105. On the other hand, if the result of verification of the measurement value of the ECU code is failure, the control unit 21 ends the process of FIG. 5.

Also, if the result of verification of the measurement value of the ECU code is failure, the control unit 21 may execute predetermined error processing. For example, the control unit 21 may transmit an error message indicating that the result of verification of the measurement value of the ECU code is failure to the server device 2000. The server device 2000 may execute predetermined error processing in accordance with the error message. For example, the server device 2000 may retransmit the ECU code and the expected value (CMAC) to the data security device 1010 or regenerate the expected value (CMAC) to transmit the regenerated expected value (CMAC) to the data security device 1010.

(Step S105) The control unit 21 of the data security device 1010 transmits the ECU code for which the verification of the measurement value of the ECU code has succeeded to the ECU 1020 through the interface unit 20. The ECU 1020 receives the ECU code transmitted from the data security device 1010.

(Step S106) The control unit 41 of the ECU 1020 applies the ECU code received from the data security device 1010 to its own ECU 1020.

(Step S107) The control unit 41 of the ECU 1020 executes secure boot after application of the ECU code. In this secure boot, the measurement unit 53 of the SHE 1022 calculates the measurement value of the ECU code by using the signature key Kbe stored in the storage unit 1023. In the present embodiment, the CMAC is used as an example of the measurement value. Consequently, the measurement unit 53 calculates the CMAC of the ECU code by using the signature key Kbe stored in the storage unit 1023. The measurement unit 53 compares the CMAC of the calculation result with the expected value. The control unit 41 pre-sets the expected value in the SHE 1022 before execution of the secure boot. A secure boot result is success if a result of the comparison between the CMAC of the calculation result and the expected value indicates that the two match and a secure boot result is failure if the two do not match. The SHE 1022 transfers the secure boot result to the control unit 41. If the secure boot result is success, the control unit 41 advances execution of the ECU code. On the other hand, if the secure boot result is failure, the control unit 41 stops execution of the ECU code.

Also, an expected value for use in the secure boot of the ECU 1020 is pre-supplied from the server device 2000 or the data security device 1010 to the ECU 1020. If the server device 2000 supplies the expected value for use in the secure boot to the ECU 1020, the expected value calculation unit 2013 of the server device 2000 calculates the expected value (CMAC) of the ECU code by using the signature key Kbe of the ECU 1020. The signature key Kbe of the ECU 1020 is pre-shared between the ECU 1020 and the server device 2000. Also, the server device 2000 calculates the expected value (CMAC) of the "expected value (CMAC) for use in the secure boot of the ECU 1020" by using the signature key Kbc of the data security device 1010 as in the above step S102. Then, the server device 2000 may transmit the CMAC of this calculation result and the "expected value (CMAC) for use in the secure boot of the ECU 1020" to the data security device 1010 as in the above step S103. The data security device 1010 verifies the "expected value (CMAC) for use in the secure boot of the ECU 1020" received from the server device 2000 and the CMAC of the expected value by using its own signature key Kbc as in the above step S104. As in step S105, the data security device 1010 transmits the "expected value (CMAC) for use in the secure boot of the ECU 1020" received from the server device 2000 to the ECU 1020 if the verification has succeeded. The "expected value (CMAC) for use in the secure boot of the ECU 1020" is an example of data to be applied to the ECU 1020.

On the other hand, if the data security device 1010 supplies an expected value for use in the secure boot to the ECU 1020, the data security device 1010 includes an expected value calculation unit and calculates the expected value of the ECU code (CMAC) by using the signature key Kbe of the ECU 1020. The signature key Kbe of the ECU 1020 is pre-shared between the ECU 1020 and the data security device 1010.

(Step S108) The control unit 41 of the ECU 1020 transmits a secure boot result "success or failure" to the data security device 1010 through the interface unit 40. The data security device 1010 transfers the secure boot result "success or failure" received from the ECU 1020 to the server device 2000. The secure boot result "success or failure" corresponds to a data application result indicating success or failure of application of the ECU code to the ECU 1020.

The server device 2000 receives the secure boot result "success or failure" transmitted from the data security device 1010 through the communication unit 2011. The server device 2000 executes a predetermined process in accordance with the secure boot result "success or failure" received from the data security device 1010. For example, if the secure boot result is a success, the success is recorded.

On the other hand, if the secure boot result is failure, the server device 2000 may execute predetermined error processing. For example, as the error processing, the server device 2000 may retransmit the ECU code and the expected value (CMAC) to the data security device 1010 or regenerate the expected value (CMAC) to transmit the regenerated expected value (CMAC) to the data security device 1010. Also, the error processing may be iterated until the secure boot result is a success or may be iterated a predetermined number of times.

Also, the secure boot after the application of the ECU code of the above step S107 is not mandatory or may not be executed.

Next, a modified example of the above-described data provision method of FIG. 5 will be described.

Modified Example 1 of Data Provision Method

In step S103, the server device 2000 encrypts an ECU code through the cryptographic processing unit 2016 and transmits the encrypted code to the data security device 1010. A key for use in the encryption is an encryption key Kec of the data security device 1010. The data security device 1010 decrypts encrypted data received from the server device 2000 with the encryption key Kec stored in the storage unit 1013 through the cryptographic processing unit 32 of the HSM 1012 to acquire the ECU code.

Modified Example 2 of Data Provision Method

In step S105, the data security device 1010 encrypts an ECU code through the cryptographic processing unit 32 of the HSM 1012 and transmits the encrypted code to the ECU 1020. A key for use in encryption is pre-shared between the data security device 1010 and the ECU 1020. The ECU 1020 decrypts encrypted data received from the data security device 1010 with a corresponding key stored in the storage unit 1023 through the cryptographic processing unit 52 of the SHE 1022 and acquires the ECU code.

Modified Example 3 of Data Provision Method

In step S105, the ECU code is stored in a packet of the CAN 1030 and transmitted from the data security device 1010 to the ECU 1020. The data security device 1010 further includes a CMAC for the packet in the packet. A key for use in generation of the CMAC is pre-shared between the data security device 1010 and the ECU 1020. The ECU 1020 verifies the CMAC included in the packet received from data security device 1010 with a corresponding key. The ECU 1020 applies the ECU code if the verification of the CMAC has succeeded. On the other hand, the ECU 1020 does not apply the ECU code if the verification of the CMAC has failed.

Also, as the CMAC to be included in a packet storing an ECU code, the CMAC for all or a part of the ECU code may be used. For example, the data security device 1010 may divide the ECU code into blocks of a fixed size, calculate the CMAC for each block, and store the block and the CMAC in a packet. The ECU 1020 acquires the ECU code while verifying the CMAC for each block. A key for use in generation of the CMAC is pre-shared between the data security device 1010 and the ECU 1020.

Modified Example 4 of Data Provision Method

In step S108, the secure boot result "success or failure" transmitted from the ECU 1020 to the server device 2000 is set to a predetermined value. For example, success may be "1" and failure may be "0".

Modified Example 5 of Data Provision Method

In step S108, the secure boot result "success or failure" transmitted from the ECU 1020 to the server device 2000 is set as a CMAC of the ECU code of a calculation result in the secure boot in step S107. The verification unit 2014 of the server device 2000 calculates the CMAC of the ECU code transmitted to the data security device 1010 in step S103 by using the signature key Kbe of the ECU 1020. The verification unit 2014 of the server device 2000 compares the CMAC of the calculation result with the CMAC of the secure boot result of the ECU 1020. The verification unit 2014 of the server device 2000 determines that the secure boot result of the ECU 1020 is success if a result of the comparison indicates that the two match and determines that the secure boot result of the ECU 1020 is failure if a result of the comparison indicates that the two do not match.

Modified Example 6 of Data Provision Method

The server device 2000 pre-supplies the ECU 1020 with a verification value (for example, a random number). In step S108, the ECU 1020 includes the verification value in the secure boot result "success" if the secure boot result is success and does not include the verification value in the secure boot result "failure" if the secure boot result is failure. The verification unit 2014 of the server device 2000 pre-compares the verification value included in the secure boot result "success" of the ECU 1020 with an original verification value pre-supplied to the ECU 1020. The verification unit 2014 of the server device 2000 determines that the secure boot result of the ECU 1020 is success if a result of the comparison indicates that the two match and determines that the secure boot result of the ECU 1020 is failure if a result of the comparison indicates that the two do not match.

Modified Example 7 of Data Provision Method

Two or more of the modified examples 4, 5, and 6 of the above-described data provision method are combined and applied.

Modified Example 8 of Data Provision Method

In the above-described modified examples 4, 5, 6, and 7 of the data provision method, the ECU 1020 encrypts a secure boot result through the cryptographic processing unit 52 of the SHE 1022 and transmits the encrypted secure boot result to the server device 2000. A key for use in encryption is pre-shared between the server device 2000 and the ECU 1020. The server device 2000 decrypts encrypted data from the ECU 1020 with a corresponding key stored in the storage unit 2012 through the cryptographic processing unit 2016 and acquires the secure boot result. As a key for use in encryption, an encryption key usable by the SHE 1022 may be used only when the secure boot result is success. In this case, the secure boot result "success" may be encrypted with the encryption key.

Figure 6:
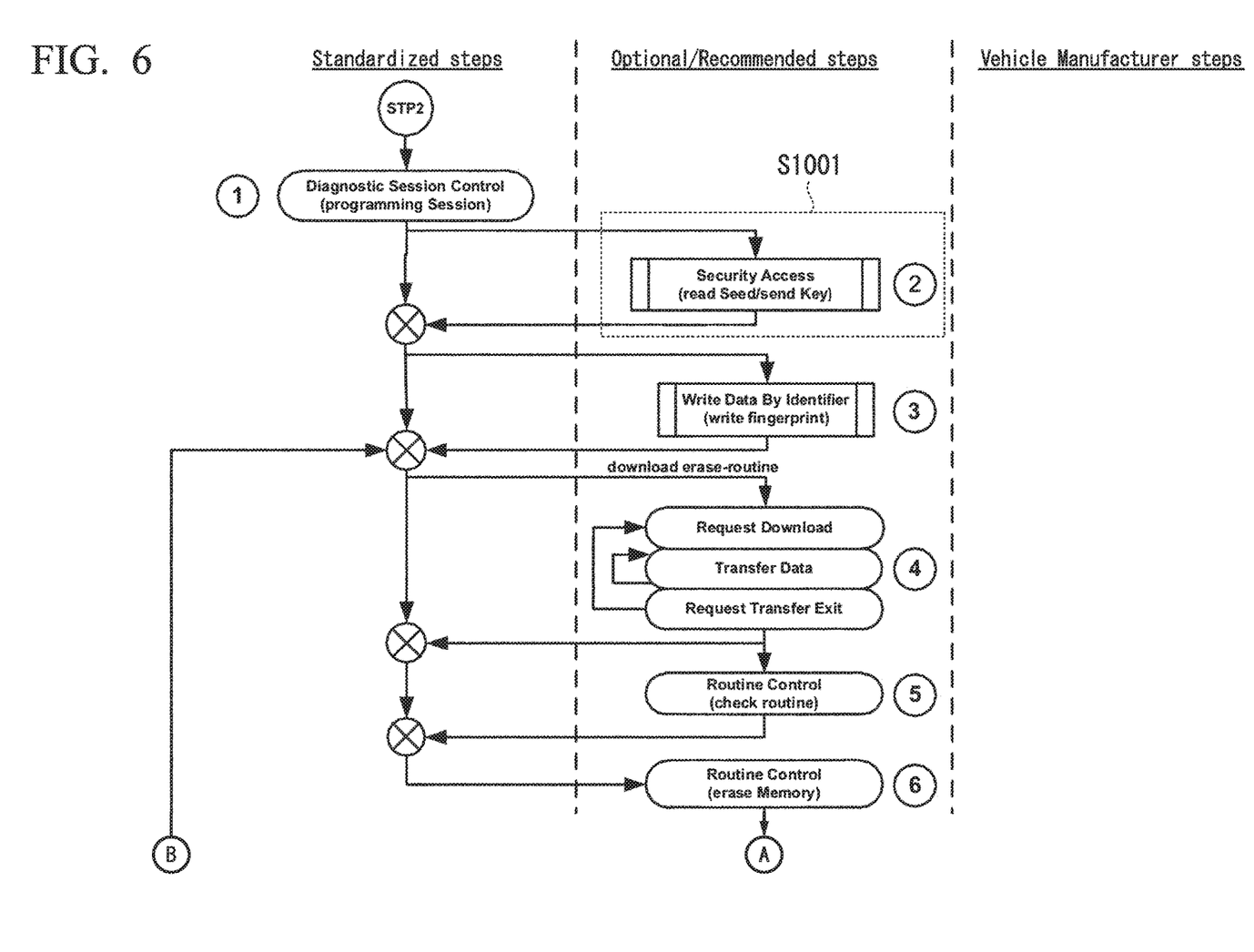
FIG. 6 is a flowchart showing an example of a data provision method according to an embodiment.
Figure 7:
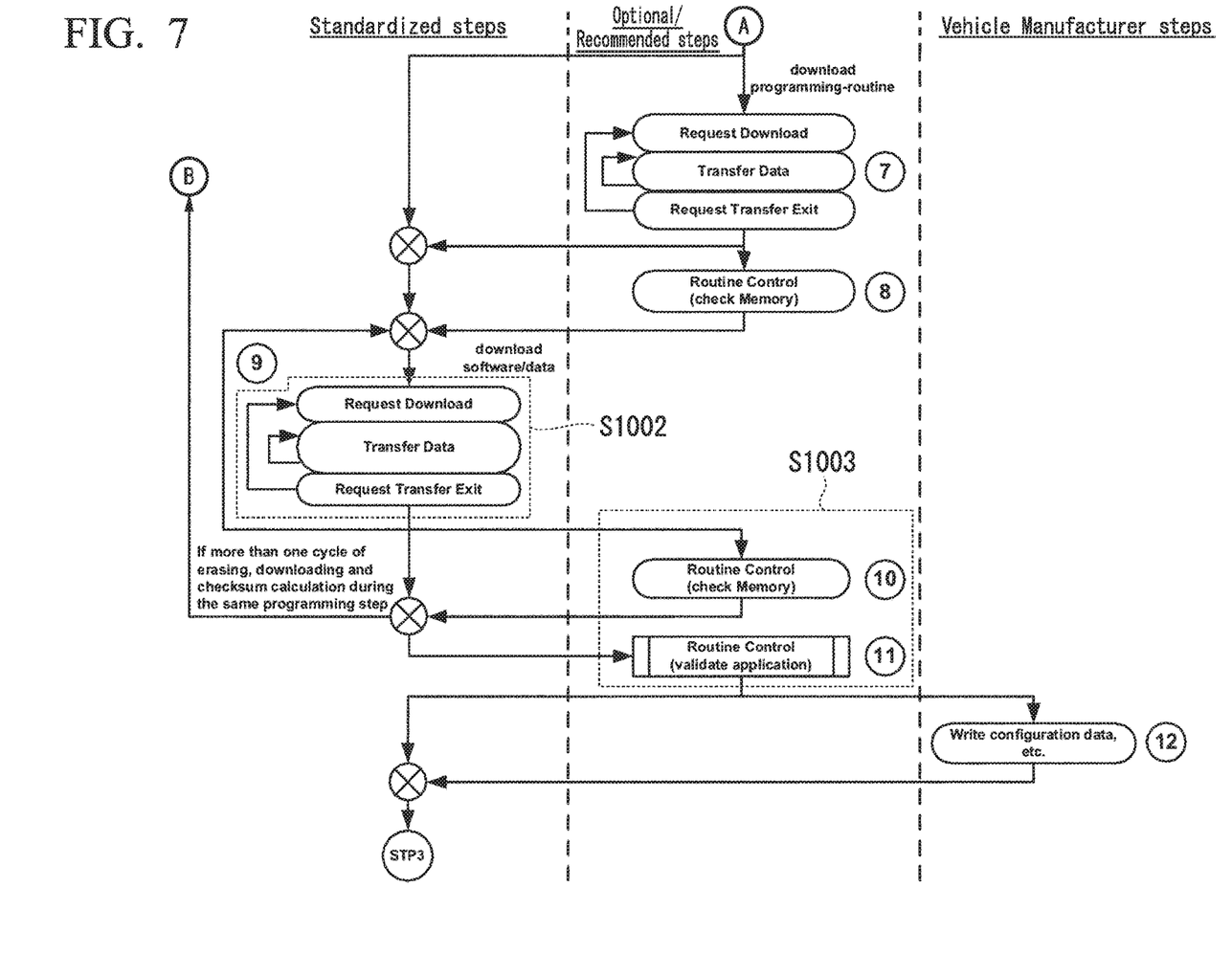
FIG. 7 is a flowchart showing an example of a data provision method according to an embodiment.
Figure 8:
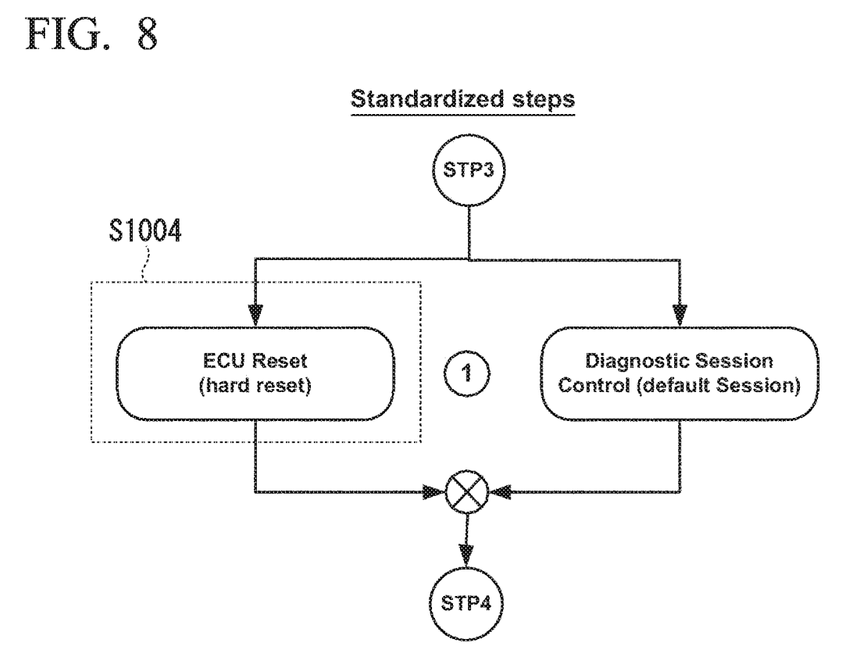
FIG. 8 is a flowchart showing an example of a data provision method according to an embodiment.

Next, an example of a relationship between the data security device 1010 and the ECU 1020 in the above-described data provision method of FIG. 5 will be described. FIGS. 6 to 8 are flowcharts showing examples of the data provision method according to the present embodiment. In the present embodiment, in "Non-volatile server memory programming process" of Chapter 15 described in Non-Patent Document 3, a procedure of "15.2.1.2 Programming step of phase #1—Download of application software and data" and a procedure of "15.2.1.3 Post-Programming step of phase #1—Re-synchronization of vehicle network" are used. In FIGS. 6 and 7, an application example in "graphically depicts the functionality embedded in the programming step of phase #1." of FIG. 33 of "15.2.1.2 Programming step of phase #1—Download of application software and data" described in Non-Patent Document 3 is shown. In FIG. 8, an application example in "graphically depicts the functionality embedded in the post-programming step of phase #1." of FIG. 34 of "15.2.1.3 Post-Programming step of phase #1—Re-synchronization of vehicle network" described in Non-Patent Document 3 is shown.

In FIG. 6, a step denoted by a reference sign S1001 corresponds to a security access process of the data security device 1010. In FIG. 7, a step denoted by a reference sign 51002 corresponds to a process of decrypting each block of the ECU code of the data security device 1010 and verifying a digital signature. In FIG. 7, a step denoted by a reference sign 51003 corresponds to an ECU code verification process of the ECU 1020. In FIG. 8, a step denoted by a reference sign S1004 corresponds to a secure boot process after the ECU code of the ECU 1020 is applied.

According to the above-described embodiment, the data security device 1010 verifies a measurement value (CMAC) of the ECU code on the basis of the expected value (CMAC) of the ECU code provided from the server device 2000 and transmits the ECU code for which the verification of the measurement value (CMAC) has succeeded to the ECU 1020. Thereby, the reliability of the ECU code applied to the ECU 1020 can be improved. If the server device 2000 supplies an expected value for use in secure boot to the ECU 1020, the data security device 1010 verifies the "expected value for use in the secure boot of the ECU 1020" received from the server device 2000 and an expected value (CMAC) for the expected value as in the ECU code. Thereby, it is possible to improve the reliability of the "expected value for use in the secure boot" to be applied to the ECU 1020.

In the above-described embodiment, the server device 2000 corresponds to the data provision device.

Also, the maintenance tool 2100 may have a function similar to that of the server device 2000. The maintenance tool 2100 provides the ECU code to the ECU 1020 via the diagnostic port 1060 and the data security device 1010 in a data provision method similar to that of the server device 2000.

Further, the TCU 1050 or the gateway 1070 of the car 1001 may have the function of the data security device 1010.

Although embodiments of the present invention have been described above with reference to the drawings, specific configurations are not limited to the embodiments, and design changes and the like may also be included without departing from the scope of the present invention.

In the above-described embodiment, an HSM or an SHE is used for the data security device 1010 or the ECU 1020, but a cryptographic processing chip other than the HSM and the SHE may be used. For the data security device 1010, for example, a cryptographic processing chip called "trusted platform module (TPM)f(TMPf)" may be used. TPMf is tamper resistant. TPMf is an example of a secure element. For the ECU 1020, for example, a cryptographic processing chip called "TPMt" may be used. TPMt is tamper resistant. TPMt is an example of a secure element.

The above-described embodiment may be applied to an ECU installed in a car in a car manufacturing process in a car manufacturing factory. Also, the above-described embodiment may be applied to an ECU installed in a car in a car maintenance factory, a car store, or the like.

Although a car is an exemplary example of a vehicle in the embodiment described above, the present invention is also applicable to other vehicles other than a car such as a bicycle with a prime mover or a railway vehicle.

Also, processes may be performed by recording a computer program for implementing functions of each device described above on a computer-readable recording medium and causing a computer system to read and execute the program recorded on the recording medium. Also, the "computer system" described here may include an operating system (OS) and hardware such as peripheral devices.

Also, the "computer-readable recording medium" refers to a storage device including a flexible disk, a magneto-optical disc, a read only memory (ROM), a writable non-volatile memory such as a flash memory, a portable medium such as a digital versatile disc (DVD), and a hard disk embedded in the computer system.

Furthermore, the "computer-readable recording medium" is assumed to include a medium that holds a program for a fixed period of time, such as a volatile memory (for example, a dynamic random access memory (DRAM)) inside a computer system serving as a server or a client when the program is transmitted via a network such as the Internet or a communication circuit such as a telephone circuit.

Also, the above-described program may be transmitted from a computer system storing the program in a storage device or the like via a transmission medium or transmitted to another computer system by transmission waves in a transmission medium. Here, the "transmission medium" for transmitting the program refers to a medium having a function of transmitting information, such as a network (a communication network) like the Internet or a communication circuit (a communication line) like a telephone circuit.

Also, the above-described program may be a program for implementing some of the above-described functions.

Further, the above-described program may be a program capable of implementing the above-described functions in combination with a program already recorded on the computer system, i.e., a so-called differential file (differential program).

INDUSTRIAL APPLICABILITY

According to the present invention, it is possible to improve the reliability of data to be applied to an in-vehicle computer such as an ECU.

REFERENCE SIGNS LIST 22, 42, 2012 Storage unit
2013 Expected value calculation unit
2014 Verification unit
32, 52, 2016 Cryptographic processing unit
20, 40 Interface unit
21, 41 Control unit
33, 53 Measurement unit
1001 Car
1002 In-vehicle computer system
1010 Data security device
1011, 1021 Main computing unit
1012 HSM
1013, 1023 Storage unit
1020 ECU
1022 SHE
1030 CAN
1040 Infotainment device
1050 TCU
1051 Communication module
1052 SIM
1060 Diagnostic port
1070 Gateway
2000 Server device
2011 Communication unit
2015 Key generation unit
2100 Maintenance tool

The invention claimed is:

1. A data provision system, comprising:
a data provision device;
a data security device; and
an in-vehicle computer installed in a vehicle,
wherein the data provision device includes:
at least one first memory configured to store instructions; and
at least one first processor configured to execute the instructions to,
transmit a first data, which is a computer program or setting data, to be applied to the in-vehicle computer to the vehicle, and
transmit a first message authentication code of the first data and a third message authentication code of the first message authentication code to the data security device,
the data security device includes:
at least one second memory configured to store instructions; and
at least one second processor configured to execute the instructions to,
calculate a fourth message authentication code of the first message authentication code received from the data provision device and verify the fourth message authentication code on the basis of the third message authentication code received from the data provision device, and
transmit the first message authentication code for which the verification of the fourth message authentication code has succeeded to the in-vehicle computer,
the in-vehicle computer includes:
at least one third memory configured to store instructions; and
at least one third processor configured to execute the instructions to,
apply the first data provided by the data provision device to the in-vehicle computer, set a first message authentication code, which is provided by the data provision device in advance and is transmitted when the verification in the data security device has succeeded, as an expected value for use in a secure boot, and execute the secure boot after applying the first data to the in-vehicle computer,
calculate, in the secure boot, a second message authentication code of the first data applied to the in-vehicle computer, and verify the second message authentication code on the basis of the expected value, and
transmit a data application result indicating success or failure of application of the first data to the in-vehicle computer based on a result of the verification,
wherein the one first processor of the data provision device is configured to receive the data application result from the vehicle.

2. A data provision method for use in a data provision system including a data provision device, a data security device, and an in-vehicle computer installed in a vehicle, the data provision method comprising:
transmitting, by the data provision device, a first data, which is a computer program or setting data, to be applied to the in-vehicle computer to the vehicle through a vehicle interface configured to transmit data to and receive data from the vehicle;
transmitting, by the data provision device, a first message authentication code of the first data and a third message authentication code of the first message authentication code to the data security device;
calculating, by the data security device, a fourth message authentication code of the first message authentication code received from the data provision device through a second interface unit configured to transmit data to and receive data from a device outside the data security device and verifying the fourth message authentication code on the basis of the third message authentication code received from the data provision device through the second interface unit; and
transmitting, by the data security device, the first message authentication code for which the verification of the fourth message authentication code has succeeded to the in-vehicle computer through the second interface unit;
applying, by the in-vehicle computer, the first data provided by the data provision device to the in-vehicle computer, setting a first message authentication code, which is provided by the data provision device in advance and is transmitted when the verification in the data security device has succeeded, as an expected value for use in a secure boot, and executing the secure boot after applying the first data to the in-vehicle computer;
calculating in the secure boot, by the in-vehicle computer, a second message authentication code of the first data applied to the in-vehicle computer, and verifying the second message authentication code on the basis of the expected value;
transmitting, by the in-vehicle computer, a data application result indicating success or failure of application of the first data to the in-vehicle computer based on a result of the verification through the first interface unit configured to transmit data to and receive data from a device outside the in-vehicle computer; and
receiving, by the data provision device, the data application result from the vehicle through the vehicle interface.

3. The data provision system according to claim 1,
wherein the one first processor of the data provision device is further configured to calculate the first message authentication code using a first common key of the in-vehicle computer, and
the one third processor of the in-vehicle computer is configured to calculate the second message authentication code using the first common key of the in-vehicle computer.

4. The data provision system according to claim 3,
wherein the one first processor of the data provision device is configured to calculate the third message authentication code using a second common key of the data security device, and
the one second processor of the data security device is configured to calculate the fourth message authentication code using the second common key of the data security device.

* * * * *